United States Patent Office 2,862,927
Patented Dec. 2, 1958

2,862,927

HETEROCYCLIC NITROGEN COMPOUND POLYMER INHIBITORS

Harold R. Snyder, Urbana, Ill., assignor to Phillips Petroleum Company, a corporation of Delaware No Drawing. Application June 16, 1955
Serial No. 516,039

13 Claims. (Cl. 260—290)

This invention relates to a process for inhibiting polymerization of polymerizable heterocyclic compounds containing a hetero nitrogen atom. In one of its aspects, this invention relates to the inhibiting of polymerization of alkenyl-substituted heterocyclic nitrogen-containing compounds. In still another aspect, this invention relates to the inhibiting of the formation of polymer in vinylpyridine compounds.

The words inhibit and stabilize as used in this specification and the attached claims are used to mean that the formation of polymer is materially reduced or prevented, and do not imply any mechanism for accomplishing this purpose.

Alkenyl-substituted heterocyclic nitrogen-containing compounds are frequently produced by dehydrogenation of the corresponding alkyl-substiuted compound. The dehydrogenation is not complete and the resulting mixture is separated into its component parts, chiefly alkyl and alkenyl-substituted nitrogen-containing heterocyclic ring compounds, by suitable means such as distillation. However, the tendency of the alkenyl-substituted compound to polymerize is a major difficulty encountered in the manufacture and storage of these compounds. As this tendency is enhanced by elevated temperature, the separation of the alkenyl-substituted compound from other constituents by distillation is extremely difficult, due to the formation of polymer within the distillation column and auxiliary equipment.

In the processing of alkenyl-substituted heterocyclic nitrogen-containing compounds, polymerization occurs which manifests itself in two ways. Soluble polymers are formed which are evidenced by an increase in viscosity, and ultimately, by forming a solid mass. Also formed are insoluble polymers or proliferous polymers referred to in the trade, and herein, as popcorn polymers. The popcorn polymer is insoluble in the heterocyclic nitrogen compound and in other organic compounds, and when in contact with a monomer, it continues to grow. This problem is particularly acute in the manufacture, processing and storing of vinyl-substituted pyridines obtained by the dehydrogenation of the corresponding ethyl-substituted pyridines. The method generally used to avoid the formation of these polymers is to add a stabilizing agent or polymerization inhibitor. However, one difficulty encountered in the process of adding a stabilizing agent to these alkenyl-substituted heterocyclic nitrogen-containing compounds is that the inhibitor which is effective in preventing the formation of soluble polymer is frequently only partially effective in preventing the formation of popcorn polymer, or the reverse can be true. Also, an inhibitor at one temperature is not necessarily useful at another temperature.

An object of this invention is to provide a method of stabilizing alkenyl-substituted heterocyclic nitrogen-containing compounds against polymerization.

Another object of this invention is to provide an alkenyl-substituted heterocyclic nitrogen-containing compound stabilized against polymerization.

Still another object of this invention is to provide a novel polymerization inhibitor effective against both soluble and popcorn polymer formation in alkenyl-substituted heterocyclic nitrogen-containing compounds.

Still another object of this invention is to provide a polymerization inhibitor especially useful in a distillation column wherein alkenyl-substituted heterocyclic nitrogen-containing monomers are being separated from other compounds.

Still other objects and advantages of this invention will be apparent to those skilled in the art having been given this disclosure.

It has now been discovered that selected naphthols and derivatives thereof of the following general formula are effective inhibitors toward the formation of soluble and popcorn polymers in heterocyclic nitrogen-containing monomers.

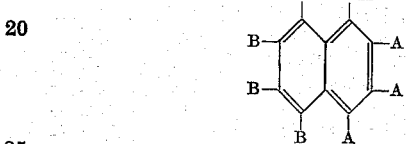

In the above general formula, A is selected from the group consisting of $NO_2$ and H, and at least one A is $NO_2$; B is selected from the group consisting of hydrogen, alkyl, alkoxy, hydroxy, carboxy, sulfo and halogen. That is, the inhibitor is a nitronaphthol wherein the $NO_2$ substituents are in the ortho-, meta-, and/or para-positions. In preparing such compounds, the ortho- and para-positions are the most easily substituted and for that reason, the 2-nitro-, 4-nitro-, and the 2,4-dinitro-1-naphthols are the preferred inhibitors. The boiling point of the 1-naphthols will be dependent upon the nature of the substituent. In general, B, when organic, will contain not more than 3 carbon atoms, and in general, at least 2 of said B's will be hydrogen. In particular, 2,4-dinitro-1-naphthol will have a suitable boiling temperature when separating 2-methyl-5-vinylpyridine from 2-methyl-5-ethylpyridine. As more substituents are added in the B position, the boiling point is generally increased, and such substituted nitro-1-naphthols will be useful in separating, say vinylquinoline from other quinolines. It will be apparent that non-interferring substituents can be present. Also the alkali metal and ammonium salt of the acid groups are useful in this invention.

According to this invention, polymerizable heterocyclic nitrogen-containing compounds are stabilized against polymerization by the addition of a nitro-1-naphthol of the type described.

In general, the amount of inhibitor used will be in the range of 0.01 weight percent to 5 weight percent based on the polymerizable compound with an amount in the range of 0.05 to 2 weight percent being most frequently used. It will be understood by those skilled in the art that lesser amounts can be used but may not provide adequate protection while greater amounts are not ordinarily required.

Examples of the inhibiting compounds are 2,4-dinitro-1-naphthol; 2-nitro - 1 - naphthol; 4 - nitro - 1 - naphthol; 2,3-dinitro-1-naphthol; 3,4-dinitro-1-naphthol; 2,4-dinitro-1-naphthol-7-sulfonic acid; 2,4-dinitro-1-naphthol-5-sulfonic acid; 2,4 - dinitro - 1 - naphthol - 8 - sulfonic acid; 2,4-dinitro-5-methyl-1 - naphthol; 2,4 - dinitro - 6 - propyl-1-naphthol; 2,4-dinitro-5-methoxy-1-naphthol; 2 - nitro-7-chloro-1-naphthol, 2-nitro - 1 - naphthol - 7 - carboxylic acid; 2-nitro-5,7-dichloro-1-naphthol; 4-nitro-5-methyl-7-ethyl-1-naphthol; 2,3-dinitro-4,6 - diethyl - 1 - naphthol; 2,3,4-trinitro-1-naphthol; 2,3,4-trinitro-1-naphthol-5,7-disulfonic acid; sodium salt of 2,4-dinitro-1-naphthol-7- sulfonic acid; potassium salt of 2-nitro-1-naphthol-7-carboxylic acid and the like.

Both the soluble and popcorn polymer formation are inhibited by the compounds of this invention. These inhibitors are particularly useful in distillation processes since the material is effective both in the pot and in the column, however, these inhibitors are also effective as storage inhibitors.

One group of polymerizable heterocyclic nitrogen compounds which are inhibited in accordance with my invention comprises the vinylpyridines with the vinyl group being present in any of the several positions in the pyridine ring. Alkyl groups can be present on the ring or on the alpha carbon atoms of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups, at least one of said groups being vinyl or alpha-methylvinyl; and the total number of carbon atoms in the alkyl groups being not greater than 12. Examples of such compounds include 2-vinylpyridine; 3-vinylpyridine; 4-vinylpyridine; 2,3,4 - trimethyl - 5 - vinylpyridine; 3,4,5,6 - tetramethyl-2-vinylpyridine; 2-methyl-5-vinylpyridine; 3-ethyl-5-vinylpyridine; 2,6-diethyl-4-vinylpyridine; 2-isopropyl-4-nonyl-5 - vinylpyridine; 2 - methyl-5-undecyl-6-vinylpyridine; 3-dodecyl - 4 - vinylpyridine; 2,4 - dimethyl - 5,6-diphenyl-3-vinylpyridine; 3-alpha-methylvinylpyridine; and similar substituted alkene and alkadiene pyridines.

Other polymerizable heterocyclic compounds containing a hetero nitrogen atom stabilized by the method of this invention are those vinyl and alpha-methylvinyl substituted heterocyclic nitrogen compounds in which the ring structure is unsaturated, partially saturated, and completely saturated. That is, such compounds as alkene, alkadiene and alkyne substituted pyridines, quinolines, isoquinolines, piperidines, pyrroles, pyrrolidines, pyrrolidones, alkyl derivatives of the foregoing compounds, dihydro and tetrahydropyridines, partially hydrogenated quinolines, isoquinolines, and pyrrolines (dihydropyrroles). Of special importance are the vinyl and alphamethylvinyl substituted derivatives of these heterocyclic nitrogen containing compounds, examples of which are 2-vinylquinoline; 8-ethyl-2-vinylquinoline; 4-hexyl-5-vinylquinoline; 1 - vinylisoquinoline; 5 - methyl - 1 - isopropenylisoquinoline; vinylpyrrolidone; vinylpyrrole; vinyl-piperidine; vinylpyrrolidine and the like. Normally the alkene, alkadiene or alkyne substituents will be attached to a ring carbon atom. However, in compounds wherein the ring nitrogen atom is a secondary nitrogen atom, the vinyl group can be attached to this ring nitrogen atom. For example, N-vinylcarbazole and N-vinylpyrrolidone. The inhibitors of this invention are particularly applicable to separation by distillation of organic mixtures containing a substantial proportion of vinylpyridine compound. Examples of vinylpyridine compounds contained in such mixtures are 2-vinyl-4,6-dimethylpyridine, 2 - methyl - 4 - vinylpyridine, 2-methyl-5-vinylpyridine, 5-ethyl-2-vinylpyridine, 5-aryl-2-vinylpyridine, and the like.

The heterocyclic compound containing a hetero nitrogen atom of particular commercial importance is 2-methyl-5-vinylpyridine (MVP). For that reason, I will illustrate how my invention is useful in inhibiting polymer formation using 2-methyl-5-vinylpyridine and a nitro-1-naphthol such as 2,4-dinitro-1-naphthol having particular application to separation of 2 - methyl - 5 - vinylpyridine from 2-methyl-5-ethylpyridine. Also illustrated is such a naphthol having a sulfo substituent, namely 2,4-dinitro-1-naphthol-7-sulfonic acid. It will be understood by those skilled in the art that the heterocyclic nitrogen containing compounds as disclosed can be similarly inhibited against polymerization by the other nitro-1-naphthols disclosed.

EXAMPLE I

Certain naphthols were tested for their effectiveness as inhibitors of soluble polymer formation in 2-methyl-5-vinylpyridine (MVP). Samples of 2-methyl-5-vinylpyridine containing 5 weight percent water were placed in vials and to each vial was added a small piece of steel and the inhibitor to be tested. The vials were then flushed with nitrogen and sealed tightly with screw-on tops. The vials were then placed in an oven and maintained at 185° F. for 16 hours, after which a weighed sample of the contents of each vial was evaporated under vacuum and over boiling water. The residue which remained was considered to be soluble polymer. The results of these tests are given below in Table I.

Table I

| Inhibitor | Amount of inhibitor used (weight percent of MVP) | Amount of polymer formed (weight percent), duplicate runs | |
|---|---|---|---|
| 2,4-dinitro-1-napthol | 0.1 | .64 | .69 |
|  | 0.3 | .49 | .57 |
|  | 0.6 | .66 | .70 |
| 2,4-dinitro-1-naphthol-7-sulfonic acid | 0.1 | .86 | .97 |
|  | 0.3 | .62 | .55 |
|  | 0.6 | .82 | .83 |
| Control | No inhibitor | 25.00 | |

EXAMPLE II

The naphthols of Example I were also tested for their effectiveness as inhibitors of soluble polymer formation by the following method: Weighed samples of 2-methyl-5-vinylpyridine (MVP) containing 5 weight percent water were refluxed for 16 hours at 185° F. under conditions of total reflux. A glass column, two feet long and three-quarters of an inch inside diameter was used. A small piece of wood having two inches of one-sixteenth inch diameter steel wire wrapped around it was used as a boiling chip. The pressure was adjusted to keep the temperature of the distillation at 185° F. and this pressure was calculated to be approximately 250 millimeters of mercury. The refluxing procedures were conducted in the presence of 0.3 percent by weight of the inhibitor to be tested (based on MVP) and after distillation, the sample was evaporated under vacuum over boiling water. The residue was considered to be soluble polymer. The control which is noted at the bottom of the following Table II was a sample of 2-methyl-5-vinylpyridine which was subjected to the same conditions as those samples containing an inhibitor except that no inhibitor was used. The results of these tests are tabulated below in Table II.

Table II

| Inhibitor | Amount of inhibitor used, weight percent | Amount of soluble polymer formed (weight percent) duplicate runs | |
|---|---|---|---|
| 2,4-dinitro-1-naphthol | 0.3 | 0.63 | 0.70 |
| 2,4-dinitro-1-naphthol-7-sulfonic acid | 0.3 | 0.56 | 0.67 |
| Control | 0 | 25.00 | |

EXAMPLE III

A group of tests were made using certain naphthols to determine their effectiveness as inhibitors for the formation of insoluble or "popcorn" polymer in 2-methyl-5-vinylpyridine. Samples of the 2-methyl-5-vinylpyridine were prepared in vials as is described above in Example I, these samples containing about 5 percent water. To each sample was added 0.3 weight percent divinylbenzene and the stated amount of the inhibitor. The inhibitor was added to the sample after the sample had been allowed to stand for about 5 hours at 185° F. This five-hour period of incubation produced a small seed of popcorn polymer after which the inhibitors were added to the sample. The control was prepared in the same way except that no inhibitor was placed in this sample. The vials were placed in an oven maintained at 185° F. and the results of these tests are noted below in Table III.

Table III

| Inhibitor | Amount of inhibitor used (weight percent) | Results |
|---|---|---|
| 2,4-dinitro-1-naphthol | 0.1 | No polymer growth in 20 days. |
| 2,4 - dinitro-1-naphthol - 7 - sulfonic acid. | 0.1 | Do. |
| Control | No inhibitor | 100 percent popcorn polymer in 8 hours. |

EXAMPLE IV

A further series of tests was made for ascertaining the effectiveness of the naphthols as inhibitors for popcorn polymer formation in 2-methyl-5-vinylpyridine (MVP). The samples were prepared in vials as is described in Example I. Each sample of the 2-methyl-5-vinylpyridine was "seeded," initially, by placing several seeds of popcorn polymer into each test vial at the beginning of the test. Each sample contained 5 weight percent water and 0.3 weight percent divinylbenzene. The control was prepared in the same way except that no inhibitor was added. The results of these tests are reported below in Table IV.

Table IV

| Inhibitor | Amount of inhibitor used (weight percent) | Results |
|---|---|---|
| 2,4-dinitro-1-naphthol | 0.1 | No polymer growth in 20 days. |
| 2,4-dinitro-1-naphthol-7-sulfonic acid. | 0.1 | Do. |
| Control | No inhibitor | 100 percent popcorn polymer in 3 hours. |

EXAMPLE V

Tests were run to determine the effectiveness of the naphthol derivatives of this invention as inhibitors during the vacuum distillation of 2-methyl-5-vinylpyridine (MVP) in a pilot plant column which was controlled so as to closely simulate commercial scale operations wherein the effluent from the dehydrogenation of 2-methyl-5-ethylpyridine is subjected to a steam and vacuum distillation. MVP, to which had been added various weight percents of the inhibitor to be tested, was fed into the top of the column. The inhibitor was added to MVP in the column kettle, initially, to give a known concentration of the inhibitor, and this concentration was maintained by proper adjustments of the overhead take-off and the feed rate of the mixture of MVP and inhibitor at the top of the column. The distillation was carried on for 10 hours at a pressure of 225 mm. of mercury. During the distillation, a low weight percent water was maintained in the kettle to simulate commercial operation and the temperatures of the kettle and overhead were maintained at 185° F. and 165 to 170° F., respectively. At the end of 10 hours, samples were taken from the kettle and tested for polymer formation by evaporating under vacuum and over boiling water as was described in Example I. The residue remaining was considered to be soluble polymer. The results of these runs and the samples tested are expressed below as Table V.

The column used in these runs was two inches in diameter and four feet long and was packed with a commercial packing. Heat was applied to the kettle with a heating mantle, and the column was heated by resistance wire which was wrapped around the column. To start a run, the kettle was initially charged with 650 ml. of MVP containing 5% water, a piece of steel wool, and the inhibitor to be tested at the desired concentration. The operating conditions and results of these runs are expressed below as Table V.

Table V

| Inhibitor | 2,4-dinitro-1-naphthol | | | | 2,4-dinitro-1-naphthol-7-sulfonic acid |
|---|---|---|---|---|---|
| Inhibitor, conc., weight percent: | | | | | |
| Kettle (initial) | 0.05 | 0.1 | 0.3 | 0.6 | 0.3 |
| Feed | 0.005 | 0.01 | 0.03 | 0.06 | 0.03 |
| Kettle temp., ° F. | 178–190 | 180–194 | 180–192 | 178–189 | 181–192 |
| Feed rates (avg.), ml./hr.: | | | | | |
| MVP (wet) | 100 | 100 | 100 | 100 | 100 |
| Water (to kettle) | 291 | 277 | 304 | 290 | 319 |
| Total | 391 | 377 | 404 | 390 | 419 |
| Overhead takeoff, ml./hr. (avg.): | | | | | |
| MVP phase | 81 | 80 | 78 | 81 | 83 |
| Water phase | 300 | 287 | 316 | 299 | 326 |
| Total | 381 | 367 | 394 | 380 | 409 |
| Wt. percent soluble polymer in kettle after 10 hours: | | | | | |
| 1 | 0.58 | 0.31 | 0.35 | 0.42 | 0.48 |
| 2 | 0.74 | 0.32 | 0.36 | 0.39 | 0.46 |
| Avg | 0.66 | 0.32 | 0.36 | 0.41 | 0.47 |

I claim:

1. A method of stabilizing a vinylpyridine, selected from the group consisting of vinyl and alpha-methylvinylpyridines and alkyl substituents thereof wherein the total carbon atoms in such alkyl substituents do not exceed 12, against polymer formation which comprises incorporating therewith a stabilizing amount of at least one compound selected from the group consisting of 2,4-dinitro-1-naphthol, 2,4-dinitro-1-naphthol-7-sulfonic acid, 2,4 - dinitro - 1 - naphthol - 8 - sulfonic acid, 2,4-dinitro-1-naphthol-5-sulfonic acid, 2,4-dinitro-5-methyl-1-naphthol, 2,4 - dinitro-6-propyl-1-naphthol, 2,4-dinitro-5-methoxy-1-naphthol and sodium salt of 2,4-dinitro-1-naphthol-7-sulfonic acid.

2. A composition of matter comprising a vinylpyridine, selected from the group consisting of vinyl and alpha-methylvinylpyridines and alkyl substituents thereof wherein the total carbon atoms in such alkyl substituents do not exceed 12, stabilized against polymer formation having incorporated therein a stabilizing amount of at least one compound selected from the group consisting of 2,4-dinitro-1-naphthol, 2,4-dinitro-1-naphthol-7-sulfonic acid, 2,4-dinitro-1-naphthol-8-sulfonic acid, 2,4-dinitro-1-naphthol-5-sulfonic acid, 2,4-dinitro-5-methyl-1-naphthol, 2,4-dinitro-6-propyl-1-naphthol, 2,4 - dinitro - 5 - methoxy - 1 - naphthol and sodium salt of 2,4-dinitro-1-naphthol-7-sulfonic acid.

3. A composition of matter comprising a vinylpyridine, selected from the group consisting of vinyl and alpha-methylvinylpyridines and alkyl substituents thereof wherein the total carbon atoms in such alkyl substituents do not exceed 12, stabilized against polymer formation having incorporated therein 0.01 to 5 weight per cent based on the weight of the vinylpyridine of at least one compound selected from the group consisting of 2,4-dinitro-1-naphthol, 2,4-dinitro-1-naphthol-7-sulfonic acid, 2,4-dinitro- 1-naphthol-8-sulfonic acid, 2,4-dinitro-1-naphthol-5-sulfonic acid, 2,4-dinitro-5-methyl-1-naphthol, 2,4-dinitro-6-propyl-1-naphthol, 2,4-dinitro-5 - methoxy - 1 - naphthol and sodium salt of 2,4-dinitro-1-naphthol-7-sulfonic acid.

4. A method for inhibiting polymer formation in a mixture of organic compounds comprising 2-methyl-5-vinylpyridine and 2-methyl-5-ethylpyridine, said process comprising adding to said mixture from 0.01 to 5 weight per cent based on the weight of the 2-methyl-5-vinylpyridine of at least one compound selected from the group consisting of 2,4-dinitro-1-naphthol, 2,4-dinitro-1-naphthol-7-sulfonic acid, 2,4-dinitro-1-naphthol-8-sulfonic acid, 2,4-dinitro-1-naphthol - 5 - sulfonic acid, 2,4 - dinitro - 5 - methyl-1-naphthol, 2,4-dinitro-6-propyl-1-naphthol, 2,4-dinitro-5-methoxyl-1-naphthol and sodium salt of 2,4-dinitro-1-naphthol-7-sulfonic acid.

5. A process for inhibiting the formation of polymer in a distillation zone in which a vinylpyridine, selected from the group consisting of vinyl and alpha-methylvinylpyridines and alkyl substituents thereof wherein the total carbon atoms in such alkyl substituents do not exceed 12, is being distilled which comprises introducing into said distillation zone 0.05 to 2 per cent by weight based on the vinylpyridine being introduced into said zone of at least one compound selected from the group consisting of 2,4-dinitro-1-naphthol, 2,4-dinitro-1-naphthol-7-sulfonic acid, 2,4-dinitro-1-naphthol-8-sulfonic acid, 2,4-dinitro-1-naphthol-5-sulfonic acid, 2,4-dinitro-5-methyl-1-naphthol, 2,4-dinitro-6-propyl-1-naphthol, 2,4- dinitro - 5 - methoxy - 1 - naphthol and sodium salt of 2,4-dinitro-1-naphthol-7-sulfonic acid.

6. 2-methyl-5-vinylpyridine having incorporated therewith an amount of 2,4-dinitro-1-naphthol effective to stabilize it against polymer formation.

7. 2-methyl-5-vinylpyridine having incorporated therewith an amount of 2,4-dinitro-1-naphthol-7-sulfonic acid effective to stabilize it against polymer formation.

8. 2-methyl-5-vinylpyridine having incorporated therewith an amount of 2,4-dinitro-1-naphthol-8-sulfonic acid effective to stabilize it against polymer formation.

9. A method of stabilizing a vinylpyridine, selected from the group consisting of vinyl and alpha-methylvinylpyridines and alkyl substituents thereof wherein the total carbon atoms in such alkyl substituents do not exceed 12, against polymerization which comprises incorporating a stabilizing amount of 2,4-dinitro-1-naphthol therein.

10. A process for inhibiting polymer formation in a mixture of organic compounds comprising 2-methyl-5-vinylpyridine and 2-methyl-5-ethylpyridine, said process comprising adding to said mixture from 0.01 to 5 weight per cent based on the weight of said 2-methyl-5-vinylpyridine of 2,4-dinitro-1-naphthol.

11. A process for inhibiting the formation of polymer in a distillation zone in which a mixture comprising a vinylpyridine, selected from the group consisting of a vinyl and alpha-methylvinylpyridines and alkyl substituents thereof wherein the total carbon atoms in such alkyl substituents do not exceed 12, is being distilled, said process comprising introducing into the feed of said distillation zone from 0.05 to 2 percent by weight, based on the weight of the vinyl-substituted pyridine compound in said feed, 2,4-dinitro-1-naphthol and effecting said distillation in the presence of said 2,4-dinitro-1-naphthol.

12. A method of stabilizing a vinylpyridine, selected from the group consisting of vinyl and alpha-methylvinylpyridines and alkyl substituents thereof wherein the total carbon atoms in such alkyl substituents do not exceed 12, against polymerization which comprises incorporating a stabilizing amount of 2,4-dinitro-1-naphthol-7-sulfonic acid therein.

13. A method of stabilizing a vinylpyridine, selected from the group consisting of vinyl and alpha-methylvinylpyridines and alkyl substituents thereof wherein the total carbon atoms in such alkyl substituents do not exceed 12, against polymerization which comprises incorporating a stabilizing amount of 2,4-dinitro-1-naphthol-8-sulfonic acid therein.

References Cited in the file of this patent

Dunbrook et al.: 644 O. G. 623–4.
Bovey et al., Chem. Reviews, vol. 42, page 495 (1948).